United States Patent [19]

Bruening et al.

[11] Patent Number: 5,244,856
[45] Date of Patent: Sep. 14, 1993

[54] POLYTETRAALKYLAMMONIUM AND POLYTRIALKYLAMINE-CONTAINING LIGANDS BONDED TO INORGANIC SUPPORTS AND PROCESSES OF USING THE SAME FOR REMOVING AND CONCENTRATING DESIRED IONS FROM SOLUTIONS

[75] Inventors: Ronald L. Bruening, Orem; Bryon J. Tarbet, Highland; Jerald S. Bradshaw; Reed M. Izatt, both of Provo, all of Utah

[73] Assignee: Brigham Young University, Provo, Utah

[21] Appl. No.: 834,917

[22] Filed: Feb. 12, 1992

Related U.S. Application Data

[63] Continuation-in-part of Ser. No. 595,309, Oct. 10, 1990, abandoned.

[51] Int. Cl.$^5$ .............................................. B01J 31/00
[52] U.S. Cl. .................................... 502/158; 502/164; 502/167; 502/401
[58] Field of Search ................ 502/164, 167, 401, 158

[56] References Cited

U.S. PATENT DOCUMENTS 5,039,419 8/1991 Bradshaw et al. .................. 502/401

Primary Examiner—Patrick P. Garvin
Assistant Examiner—Brent M. Peebles
Attorney, Agent, or Firm—Thorpe, North & Western

[57] ABSTRACT

A method for the removal and concentration of desired ions from a source solution which may contain larger concentrations of other ions including $H^+$ comprises bringing the source solution into contact with a compound comprising a polytetraalkylammonium and/or polytrialkylamine-containing ligand covalently bonded through an organic spacer silicon grouping to a solid inorganic support. The polytetraalkylammonium and/or polytrialkylamine portion(s) of the compound has an affinity for the desired ions to form a complex thereby removing the desired ions from the source solution. The desired ions are removed from the compound by contacting the compound with a much smaller volume of a receiving solution having a greater affinity for the desired ions than does the polytetraalkylammonium and/or polytrialkylamine ligand portion of the compound. The concentrated ions thus removed may be recovered by known methods. The process is useful in removing desired or unwanted ions from water streams and in the treatment of waste streams. The invention is also drawn to the polytetraalkylammonium and polytrialkylamine-containing ligands covalently bonded through a spacer grouping to a hydrophilic inorganic solid support material.

10 Claims, No Drawings

POLYTETRAALKYLAMMONIUM AND POLYTRIALKYLAMINE-CONTAINING LIGANDS BONDED TO INORGANIC SUPPORTS AND PROCESSES OF USING THE SAME FOR REMOVING AND CONCENTRATING DESIRED IONS FROM SOLUTIONS

This is a continuation-in-part of pending application Ser. No. 07/595,309 filed Oct. 10, 1990, now abandoned.

FIELD OF THE INVENTION

This invention relates to polytetraalkylammonium and polytrialkylamine-containing hydrocarbons covalently bonded to inorganic solid supports and to a process for removing and concentrating certain desired ions, from solutions wherein such ions may be admixed with other ions which may be present in much higher concentrations by the use of such polytetraalkylammonium or polytrialkylamine-solid supported materials. More particularly, this invention relates to a process for removing such ions from an admixture with others in solution by forming a complex of the desired ions with compounds composed of a polytetraalkylammonium or polytrialkylamine moiety covalently bonded to an inorganic matrix by flowing such solutions through a column packed with such polytetraalkylammonium or polytrialkylamine-solid supported materials and then breaking the complex of the desired ion from the compounds to which such ion has become attached by flowing a receiving liquid in much smaller volume than the volume of solution passed through the column to remove and concentrate the desired ions in solution in the receiving liquid. The concentrated ions thus removed may then be recovered by known methods.

BACKGROUND OF THE INVENTION

Effective methods for the recovery and/or separation of particular ions such as certain transition metal ions present as complex anions, of which $CrO_4^{2-}$, $RuCl_6^{3-}$, $PtCl_6^{2-}$, $RhCl_6^{3-}$, $IrCl_6^{3-}$, $PdCl_4^{2-}$, $AsO_3^{3-}$, $AsO_4^{3-}$, $SeO_4^{2-}$, $IO_3^-$, $TcO_4^-$ and $IO_4^-$ are illustrative, from other ions such as $H^+$, $Na^+$, $K^+$, $Mg^{2+}$, $Ca^{2+}$, $Fe^{3+}$, $Cl^-$, $NO_3^-$ and $Br^-$ and the recovery and/or separation of the desired anions from other ions in water supplies, waste solutions, and other streams, particularly those which contain large amounts of $H^+$, represent a real need in modern technology. These ions are often present at low concentrations in solutions containing other ions at much greater concentrations. Hence, there is a real need for a process to selectively concentrate and recover these ions.

It is known that polytetraalkylammonium and protonated polytrialkylammonium-containing hydrocarbon ligands present as solutes in a solvent such as water, are characterized by their ability to selectively form strong bonds with certain anions in forming precipitates and ion pairs when both the ligand and anion are present as solutes in the same solvent, even in the presence of relatively large amounts of $H^+$, and other common cations such as $Na^+$, $K^+$, $Mg^{2+}$, $Ca^{2+}$, and $Fe^{3+}$, and anions such as $Cl^-$, $NO_3^-$ and $Br^-$. However, researchers have not previously been able to incorporate polytetraalkylammonium and protonated polytrialkylamine-containing hydrocarbon ligands into separation systems where the behavior of the polytetraalkylammonium and protonated polytrialkylamine-containing ligands in the separation systems, in comparison to that of the polytetraalkylammonium and protonated polytrialkylamine-containing ligand as a solute, is very similar and the polytetraalkylammonium and protonated polytrialkylamine-containing ligand will remain in the separation system covalently bonded to an inorganic solid support such as silica gel. Articles such as those entitled *Silane Compounds for Silylating Surfaces* by E. P. Plueddemann, in "Silanes, Surfaces and Interfaces Symposium, Sowmass, 1985," Ed. by D. E. Leyden, Gordon and Breach, Publishers, 1986, pp. 1-25 and *Silane Coupling Agents* by E. P. Plueddemann, Plenum Press, 1982, pp. 1-235 list many different types of organic materials which have been attached to silane compounds and discusses some of their properties. The preparation and uses of polytetraalkylammonium and protonated polytrialkylamine-containing hydrocarbons attached to hydrophilic solid supports such as silica have not been disclosed in the above mentioned articles or in any existing patents. Representative of a book reviewing the many reported attachments of single tetraalkylammonium-containing hydrocarbons to hydrophobic polymers is *Ion Exchange in Analytical Chemistry* by H. F. Walton and R. D. Rocklin, CRC Press, 1990. Representative of articles describing the attachment of single tetraalkylammonium-containing hydrocarbons involving a benzyl group as one of the alkyl groups are Preparation and Chromatographic Evaluation of Chemically Bonded Ion-Exchange Stationary Phase I. Strong Anion Exchanger by P. A. Asmus, C. E. Lov, and M. Novotny in *Journal of Chromatography*, 123(1976) p. 25; and Comparison of New High Capacity Ion Exchange Silicas of the Spherosil Type and Normal Microparticulate Ion Exchange of the Polystyrene Divinylbenzene Type in High Performance Liquid Chromatography by M. Caude and R. Rosset in *Journal of Chromatographic Science*, 15(1977) p.405. However, the materials described in these patents have only typical anion exchange properties with relatively low selectivity (compared to the multiple tetraalkylammonium and protonated trialkylamine hydrocarbons of this application) as well as reduced and altered complexing properties due to the hydrophobic support and/or proximity of a benzene ring in the hydrocarbon. Thus, the unique complexing properties of certain polytetraalkylammonium and protonated polytrialkylamine-containing hydrocarbons and the ability to attach these polytetraalkylammonium and polytrialkylamine-containing complexing agents to inorganic solid supports such as sand or silica gel without reducing their ability to complex certain ions has heretofore been unknown, but has been found to be of utmost importance in the industrial use of the polytetraalkylammonium and protonated polytrialkylamine-containing hydrocarbon ligands. Articles and patents describing the attachment of stable polyamines to hydrophilic supports such as silica gel and their use in both protonated and non-protonated form in separating ions include the previously cited articles by E. P. Plueddemann as well as Bradshaw et. al., *Process of Removing and Concentrating Desired Ions From Solutions*, U.S. Pat. No. 4,952,321 which issued Aug. 28, 1990; S. H. Chang, K. M. Gooding, and F. E. Regnier in Use of Oxiranes in the Preparation of Bonded Phase Supports, *Journal of Chromatography*, vol. 120, pp. 321-333 (1976); and M-A Bagnoud, J-L Veuthey, and W. Haerdi in Interactions Silice Metallique-Solute: Possibilite d'Applications en Preconcentration en Chromographic d'Echange de Ligands (LEC), *Chimica*, vol.40, pp.432-434 (1986). In acidic solution protonated polyamines are capable of interacting with anions. However, in some desired separations the ability of a polyamine to form both coordination complexes and protonated interactive complexes with anions is a hinderance in obtaining the desired and needed selectivity with particular anion(s) of interest. This along with the ability of the polytetraalkylammonium ligands ability to interact with anions under a variety of pH (acidic, neutral, and basic) conditions make their use important and significantly different relative to the polyamines described. The protonated polytrialkylamine ligands have properties intermediate between the protonated polyamines described previously and polytetraalkylammonium ligands. These intermediate properties involving some coordination chemistry are sometimes optimal for making a particular separation. The unique complexing properties of the polytetraalkylammonium and polytrialkylamine-containing ligands as attached to appropriate inorganic solid supports is the subject of the present invention.

SUMMARY OF THE INVENTION

The compounds of the present invention comprise suitable polytetraalkylammonium and polytrialkylamine-containing ligands which are covalently bonded through a spacer grouping to a silicon atom and further covalently bonded to a solid support and are represented by the following Formula 1:

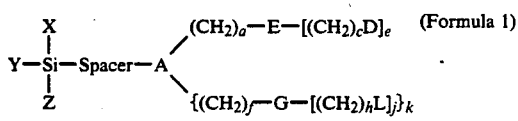
(Formula 1)

wherein Spacer is a grouping having from 1 to 10 carbon atoms and which is of a functional nature that it is sufficiently hydrophilic to function in an aqueous environment and will separate the polytetraalkylammonium ligand from the solid support surface to maximize the interaction between the ligand and desired ion being separated and is preferably a member selected from the group consisting of lower alkyl, aryl, glycidyl and alkylamino. A is a member selected from the group consisting of $NR_x$, S and O. E, D, G, and L are members selected from the group consisting of $NR_x$, S, and O, or SH and OH if S and O are located in a terminal position, with x being an integer such that the amine nitrogens present are tertiary or quaternary with the further proviso that the formula contains at least two tertiary or quaternary nitrogens from among A, E, D, G, and L. The letters a, c, f, and h represent integers ranging from 1 to 5; e and j are each integers ranging from 0 to 25, with ranges from 0 to 7 being preferably and 1-7 being most preferred; and k is an integer of 0 or 1 with the proviso that k must be 0 when A is S or O. R is a member selected from the group consisting of lower alkyl and substituted lower alkyl. By substituted alkyl is meant alkyl groups containing substituents such as halogen, nitro, alkyl amino, branched alkyl amino, and the like which do not interfere with the ability of the compound to function according to the invention. The term alkylamino and branched alkyl amino are inclusive of primary, secondary and tertiary alkyl amino groups such that the amino nitrogen can be tertiary or quaternary if desired. The alkylamine groups may also be substituted by halogen, nitro or other functional groups of a similar nature which do not interfer with the operability of the invention. X, Y, and Z are each a member selected from the group consisting of Cl, Br, I, alkyl, alkoxy, substituted alkyl or substituted alkoxy and O-solid support with the proviso that at least one of X, Y, and Z must be O-solid support. When X, Y and Z are other than O-solid support they are functionally classified as leaving groups, i.e. groups attached to the silicon atom which, when reacted with an O-solid hydrophilic support material, may leave or be replaced by the O-solid support. If any such functional leaving groups are left over after reacting a silicon containing spacer group with the solid hydrophilic support these groups will have no direct function in the interaction between the desired ion and the polytetraalkylammonium ligand-attached to the solid support. Solid support is a member selected from the group consisting of silica, zirconia, titania, alumina, nickel oxide or other functionally similar hydrophilic inorganic supports and mixtures thereof. The particular material making up the solid support is limited only by its ability to function in the invention by covalently bonding a silicon atom to which the ligand spacer grouping is in turn covalently bonded. Therefore, while silica, zirconia, titania, alumina and nickel oxide are the preferred solid supports, any other functionally equivalent material is considered to be within the scope of the invention. Alkyl or alkoxy means a 1-6 carbon member alkyl or alkoxy group which may be substituted or unsubstituted, straight or branched chain. By substituted is meant by groups such as halogen, e.g., Cl, Br, I; $NO_2$ and the like.

Typical silicon containing spacer groups for reacting with a polytetraalkylamine- or polytrialkylamine-containing ligand material to form the compounds of Formula 1 are as follows: dimethyl(triethoxysilylpropyl)-malonate; 3-mercaptopropyltrimethoxysilane; 3-aminopropyltrimethoxysilane; N-[(3-trimethoxysilyl)propyl]ethylenediaminetriacetic acid; p-(chloromethyl)-phenyltrimethoxysilane; vinyltriethoxysilane; 3-bromopropyltriethoxysilane; 3-glycidoxypropyltrimethoxysilane and the like.

The polytetraalkylammonium and protonated polytrialkylamine ligands covalently bonded to solid supports as shown in Formula 1 are characterized by high selectivity for and removal of desired anions or groups of desired anions such as $SeO_4^{2-}$, $CrO_4^{2-}$ and transition metals present as complex anions, present at low concentrations from source solutions containing a mixture of these desired ions with the ions one does not desire to remove which may be present in much greater concentrations in the source solution including hydrogen ions. The separation is effected in a separation device such as a column through which the source solution is flowed. The process of selectively removing and concentrating the desired metal is characterized by the ability to selectively and quantitatively complex the desired ions to the polytetraalkylammonium or protonated polytrialkylamine ligand portion of the polytetraalkylammonium or polytrialkylamine-containing solid support system, from a large volume of solution, even though the desired ions may be present at low concentrations. The desired ions thus separated are subsequently recovered from the separation column by flowing through it a small volume of a receiving phase which contains a solubilized reagent which need not be selective, but which will quantitatively strip the desired ions from the polytetraalkylammonium or polytrialkylamine ligand containing solid support matrix. The recovery of the desired ions from the receiving phase is easily accomplished by known procedures.

DETAILED DESCRIPTION OF THE INVENTION

As summarized above, the present invention is drawn to novel polytetraalkylammonium and polytrialkylamine-containing hydrocarbon ligands covalently bound through a spacer to a silicon moiety and further attached to a solid support, to form the novel compounds of Formula 1. The invention is also drawn to the concentration and removal of certain desired anions such as $SeO_4^{2-}$, $CrO_4^{2-}$ and transition metal containing complex anions, from other ions in water supplies, waste solutions, and other streams. The process of the invention is particularly adaptable to recovery of ions from solutions containing large amounts of hydrogen ions and a variety of other pH conditions. Such solutions from which such ions are to be concentrated and/or recovered are referred to herein as "source solutions." In many instances the concentration of desired ions in the source solutions will be much less than the concentration of other ions from which they are to be separated.

The concentration of desired ions is accomplished by forming a complex of the desired ions with a polytetraalkylammonium or protonated polytrialkylamine ligand solid support compound shown in Formula 1 by flowing a source solution containing the desired ions through a column packed with a polytetraalkylammonium or polytrialkylamine ligand-solid support compound to attract and bind the desired ions to the polytetraalkylammonium or polytrialkylamine ligand portion of such compound and subsequently breaking desired anion bound-polytetraalkylammonium or polytrialkylamine ligand compound-complex by flowing a receiving liquid in much smaller volume than the volume of source solution passed through the column to remove and concentrate the desired ions in the receiving liquid solution. The receiving liquid or recovery solution forms a stronger complex with the desired ions than does the polytetraalkylammonium or polytrialkylamine ligand or forms a stronger complex with the polytetraalkylammonium ligand than does the ion(s) of interest and thus the desired ions are quantitatively stripped from the polytetraalkylammonium or polytrialkylamine ligand containing solid support compound in concentrated form in the receiving solution. The recovery of desired ions from the receiving liquid is accomplished by known methods.

The polytetraalkylammonium- or polytrialkylamine-containing ligands, as represented by Formula 1, may be prepared by reacting a silane-spacer compound with an amine ligand compound to form an Intermediate [1] as follows:

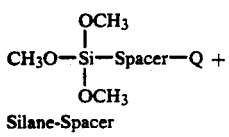
Silane-Spacer

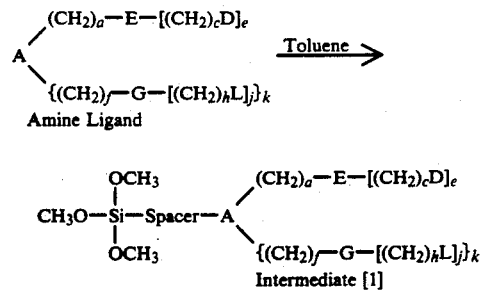

wherein Q and A are reactive groups such as epoxy and amino respectively which will react with each other allowing the formation of the Intermediate [1] compound shown above. The silane-spacer-ligand complex shown above as Intermediate [1] is then covalently attached to an inorganic solid support material such as silica gel and the amine groups are quaternized to form the polytetraalkylammonium or methylated to form the polytrialkylamine ligand containing solid support matrix of Formula 1 as follows:

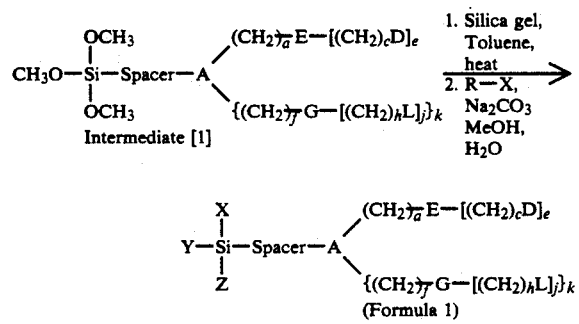

All symbols, except Q and A have the meanings first given above. When Q is epoxy, the epoxy group reacts with A in such a manner that Q becomes part of the spacer to form a linkage $-CH(OH)CH_2-A<$.

EXAMPLE 1

A polytetraalkylammonium-containing ligand was prepared by mixing pentaethylenehexamine (4.64 g, 0.02 mol) with 3-glycidoxypropyltrimethoxysilane (4.72 g, 0.02 mol) in toluene and allowing the mixture to stir overnight. Silica gel (50 g, 35-60 mesh) was added and the mixture was stirred with a mechanical stirrer (to avoid crushing the gel) and heated at 50°-70° C. overnight to covalently bond the ligand to the silica gel (one or two of the groups X, Y, Z, will be O-silica gel after this procedure). The silica gel was dried and then transferred to a new flask fitted with a mechanical stirrer with methanol as the solvent and sodium carbonate as the base. Methyl iodide (0.26 mol) was added slowly to the stirring mixture and heated at 40° C. for 4 hours. Water (100 mL) was then added and the reaction proceeded overnight. The gel was filtered, washed with water and dried, resulting in a ligand of the formula:

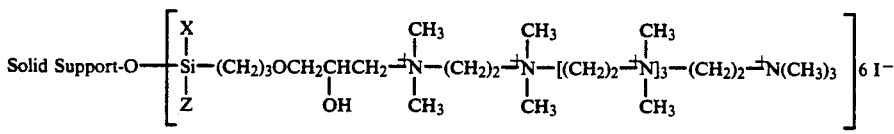

wherein ss is solid support. This ligand corresponds to Formula 1 wherein Y is O-solid support and X and Z are methoxy or O-solid support; Spacer is glycidoxypropyl; A is NR$_x$ with x=2 and R=Methyl; a is 2, k is 0 and e is 4; E and G are each NR$_x$ with x such that all the nitrogens are quaternary.

EXAMPLE 2

A different polytetraalkylammonium-containing ligand was prepared by reacting ethylenediamine (1.2 g 0.02 mol) with 3-glycidoxypropyltrimethoxysilane as above. The product was then attached to silica gel as above and quaternized in the same manner to yield a ligand of the following formula:

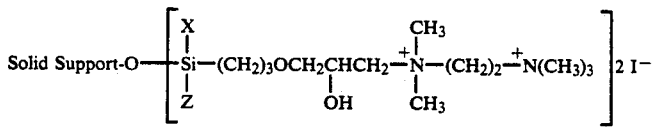

which corresponds to Formula 1 wherein Y is O-solid support, X and Z are each methoxy or O-solid support; Spacer is glycidoxypropyl; A is NR$_x$ where x=2 and R=methyl, a=2, k is 0; e is 0; and E is NR$_x$ where x=3 and R=methyl.

EXAMPLE 3

In this example the process outlined above was repeated using tris-(2-aminoethyl)amine in place of the pentaethylenehexamine of Example 1. The series of reactions, as described in Example 1, produced a ligand of the formula:

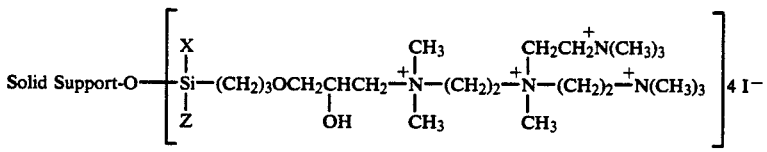

which corresponds to Formula 1 wherein Y is O-solid support, X and Z are each methoxy or O-solid support; Spacer is glycidoxypropyl; A is NR$_x$ wherein x=2 and R=Methyl; a=2; e is 1; k is 0; E and D are each NR$_x$ where x=2 and one R=Methyl and the other R=Trimethylaminoethyl in the case of E and x=3 and R=methyl in the case of D, and c is 2. This example is representative of a branched polytetraalkylammonium ligand.

EXAMPLE 4

In this example the conditions given in Example 2 were used except that the amount of methyl iodide was reduced such that the resulting ligand bonded to silica gel had the following formula:

which corresponds to Formula 1 wherein Y is O-solid support, X and Z are each methyl or O-solid support: Spacer is glycidoxy; A is NR$_x$ were x=1 and R=methyl, a=2, k is 0; e is 0; E is NR$_x$ where x=2 and R=methyl. This example is representative of a polytrialkylamine.

EXAMPLE 5

In this Example the conditions given in Example 1 were used except that the amount of methyl iodide used was reduced such that the ligand bonded to silica gel had the following formula:

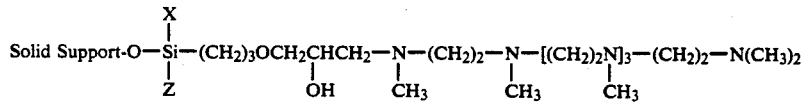

which corresponds to Formula 1 wherein Y is O-solid support, X and Z are each methoxy or O-solid support; Spacer is glycidoxypropyl; A is NR$_x$ with x=1 and R=methyl; a is 2; k is 0 and e is 4; E and D are each NR$_x$ with x=1 in the case of E and x=2 in the case of D with R=Methyl such that all the nitrogens are tertiary.

A general procedure for covalently attaching compounds represented by Formula 1 to a solid support may be accomplished by placing a compound represented by Formula 1 dissolved in a suitable solvent such as toluene in a suitable vessel and adding an appropriate amount of O-solid support material. This mixture is stirred and heated at a temperature of up to 100° C. for a time sufficient to allow covalent bonding between the O-solid support and the silicon atom to take place. Usually from about one to 24 hours is sufficient. As previously stated, suitable O-solid support materials include silica, zirconia, titania, alumina, nickel oxide or other hydrophilic inorganic supports and mixtures thereof.

The process of selectively and quantitatively concentrating and removing a desired ion or group of desired ions present at low concentrations from a plurality of other undesired ions in a multiple ion source solution in which the undesired ions may be present at much higher concentrations comprises bringing the multiple ion containing source solution into contact with a polytetraalkylammonium or protonated polytrialkylamine ligand-containing solid supported compound as shown in Formula 1 which causes the desired ion(s) to complex with the polytetraalkylammonium or protonated polytrialkylamine ligand portion of the compound and subsequently breaking or stripping the desired ion from the complex with a receiving solution which forms a stronger complex with the desired ions than does the polytetraalkylammonium or polytrialkylamine ligand or which forms a stronger complex with the polytetraalkylammonium or polytrialkylamine ligand. The receiving or recovery solution contains only the desired ions in a concentrated form.

The polytetraalkylammonium or polytrialkylamine ligand solid support functions to attract the desired ions according to Formula 2:

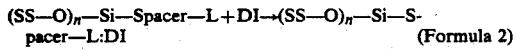

$$(SS-O)_n-Si-Spacer-L + DI \rightarrow (SS-O)_n-Si-Spacer-L:DI \quad \text{(Formula 2)}$$

Except for DI, Formula 2 is an abbreviated form of Formula 1 wherein SS stands for solid support, n is an integer of 1-3 and L stands for a polytetraalkylammonium or polytrialkylamine containing ligand. DI stands for desired ion being removed.

Once the desired ions are bound to the polytetraalkylammonium or polytrialkylamine-containing ligand, they are subsequently separated by use of a smaller volume of a receiving liquid according to Formula 3:

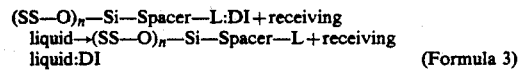

$$(SS-O)_n-Si-Spacer-L:DI + \text{receiving liquid} \rightarrow (SS-O)_n-Si-Spacer-L + \text{receiving liquid}:DI \quad \text{(Formula 3)}$$

The preferred embodiment disclosed herein involves carrying out the process by bringing a large volume of the source multiple ion solution into contact with a polytetraalkylammonium or polytrialkylamine ligand-solid support compound of Formula 1 in a separation column through which the mixture is first flowed to complex the desired metal ions (DI) with the polytetraalkylammonium or polytrialkylamine ligand-solid support compound as indicated by Formula 3 above, followed by the flow through the column of a smaller volume of a receiving liquid, such as aqueous solutions of thiourea, $NH_3$, NaI, EDTA and others which form a stronger complex with the desired ion than does the polytetraalkylammonium or polytrialkylamine-containing ligand bound to the solid support. In this manner the desired ions are carried out of the column in a concentrated form in the receiving solution. The degree or amount of concentration will obviously depend upon the concentration of desired ions in the source solution and the volume of source solution to be treated. The specific receiving liquid being utilized will also be a factor. Generally speaking the concentration of desired ions in the receiving liquid will be from 20 to 1,000,000 times greater than in the source solution. Other equivalent apparatus may be used instead of a column, e.g., a slurry which is filtered which is then washed with a receiving liquid to break the complex and recover the desired ions(s). The concentrated desired ions are then recovered from the receiving phase by known procedures.

Illustrative of desired ions which have strong affinities for polytetraalkylammonium and/or protonated polytrialkylamine-containing ligands bound to solid supports are $PtCl_6^{2-}$, $PtCl_4^{2-}$, $PdCl_4^{2-}$, $RhCl_6^{3-}$, $IrCl_6^{3-}$, $RuCl_6^{3-}$, $IrCl_6^{2-}$, $RuCl_6^{2-}$, $BiCl_6^{3-}$, $CrO_4^{2-}$, $SeO_4^{2-}$, $IO_3^-$, $IO_4^-$, $TcO_4^-$, $MnO_4^-$, $ReO_4^-$, $AuCl_4^-$, $HgCl_4^{2-}$, $PbCl_4^{2-}$, $SbCl_6^{3-}$, $SnCl_4^{2-}$, $SnCl_6^{2-}$, $SeO_3^{2-}$, $AsO_4^{3-}$, and $AsO_3^{3-}$. This listing of preferred ions is not comprehensive and is intended only to show the types of preferred ions which may be bound to polytetraalkylammonium or protonated polytrialkylamine-containing ligands attached to solid supports in the manner described above.

Removal of Desired Molecules With Ligand-Matrix Compounds

The following examples demonstrate how the polytetraalkylammonium or polytrialkylamine-containing ligand bound to a solid support compound of Formula 1 may be used to concentrate and remove desired ions. The polytetraalkylammonium or polytrialkylamine ligand containing solid support compound is placed in a column. An aqueous source solution containing the desired ion or ions, in a mixture of other ions which may be in a much greater concentration, is passed through the column. The flow rate for the solution may be increased by applying pressure with a pump on the top or bottom of the column or applying a vacuum in the receiving vessel. After the source solution has passed through the column, a much smaller volume of a recovery solution, i.e. an aqueous solution, which has a stronger affinity for the desired ions than does the polytetraalkylammonium or polytrialkylamine-containing ligand, is passed through the column. This receiving solution contains only the desired ion(s) in a concentrated form for subsequent recovery. Suitable receiving solutions can be selected from the group consisting of $Na_2S_2O_3$, thiourea, HI, HCl, NaI, $Na_4EDTA$, $Na_3NTA$, $NH_3$, $NH_4OH$, ethylenediamine and mixtures thereof. The preceding listing is exemplary and other receiving solutions may also be utilized, the only limitation being their ability to function to remove the desired ions from the polytetraalkylammonium or polytrialkylamine-containing ligand.

The following examples of separations and recoveries of ions by the inorganic support-bound polytetraalkylammonium and/or polytrialkylamine-containing ligands are given as illustrations. These examples are illustrative only, and are not comprehensive of the many separations of ions that are possible using the materials of Formula 1.

EXAMPLE 6

In this example, 2 grams of the silica gel-bound tetraalkyltris-(2-aminoethyl)ammonium ligand of Example 3 were placed in a column 1.9 cm in diameter and 2.3 cm long. A 100 ml solution of 0.001M $Na_2CrO_4$ in 0.1M NaCl was passed through the column. Inductively coupled plasma spectroscopic analysis of the solution after passing through the column revealed that greater than 99% of the $CrO_4^{2-}$ had been removed. After washing the column with distilled water, a 10 ml aqueous recovery solution of 6M HCl was passed through the column. An analysis of the recovery solution by Inductively coupled plasma spectroscopy showed that an amount of $CrO_4^{2-}$, equivalent to 98% of the $CrO_4^{2-}$ originally passed through the column, was collected.

EXAMPLE 7

In this example, 10 grams of the silica gel-bound tetraalkylpentaethylenehexaammonium ligand of Example 1 were placed in a column as described in Example 6. A 100 ml solution of 5 mM Pt(IV) present as the hexachloro complex anion $[PtCl_6^{2-}]$ in 6M HCl which also contained 10 mM Cu was passed through the column. After washing the column with 0.1M HCl, a 40 ml aqueous recovery solution of 0.1M thiourea, 0.1M HCl was passed through the column in two 20 ml aliquots. Inductively coupled plasma spectroscopic analysis of the original solution after passing through the column and the recovery aliquots indicated that the Pt(IV) was removed to a level less than 1 ppm and all of the Pt(IV) removed was recovered in the second aliquot of the recovery solution within experimental error. Furthermore, the $Cu^{2+}$ in the recovery solution was below a detection limit of 0.5 ppm. The first aliquot collected of the recovery solution contained the void column of the column from the previous washing.

Example 8

In this example, 2 grams of the silica gel-bound methylated trialkylhexaamine ligand of Example 5 were placed in a column as described in Example 6 A 250 ml solution of 10 ppm Rh(III) $[RhCl_6^{3-}]$ and 1M $NiCl_2$ in 6M HCl was passed through the column using a vacuum pump at 4 ml/minute. Inductively coupled plasma spectroscopic analysis of the solution after passing through the column revealed that the Rh(III) level was below detection. After washing the column with 0.1M HCl, a 10 ml aqueous recovery solution of 4M $(NH_4)_2SO_4$ was passed through the column. An analysis of the recovery solution by Inductively coupled plasma spectroscopy showed that all of the Rh(III) originally passed through the column was recovered within experimental error and that the $Ni^{2+}$ level in the recovery solution was less than 1 ppm.

EXAMPLE 9

In this example, 2 grams of the silica gel-bound methylated trialkylpentaethylenehexaamine of Example 5 were placed in a column as described in Example 6. A 250 ml solution of 10 ppm Ir(III) $[IrCl_6^{3-}]$ and 1M $FeCl_3$ in 6M HCl was passed through the column using a vacuum pump at 4 ml/minute. Inductively coupled plasma spectroscopic analysis of the solution after passing through the column revealed that the Ir(III) level was below detection. After washing the column with 0.1M HCl, a 10 ml aqueous recovery solution of 5M $NH_4Cl$ was passed though the column. An analysis of the recovery solution by Inductively coupled plasma spectroscopy showed that all of the Ir(III) originally passed through the column was recovered within experimental error and that the $Fe^{3+}$ level in the recovery solution was less than 1 ppm.

From the foregoing, it will be appreciated that the inorganic solid support bound polytetraalkylammonium and polytrialkylamine-containing hydrocarbon ligands of Formula 1 of the present invention provide materials useful for the separation and concentration of ions including $CrO_4^{2-}$, $PtCl_6^{2-}$, $IrCl_6^{3-}$ and $RhCl_6^{3-}$ from mixtures of these ions with other ions and in many cases $H^+$ or other pH conditions. The desired ions can then be recovered from the concentrated recovery solution by standard techniques known in the art. Similar examples have also been successfully established for many other ions.

Although the invention has been described and illustrated by reference to certain specific inorganic solid support-bound polytetraalkylammonium and polytrialkylamine-containing hydrocarbon ligands of Formula 1 and processes of using them, analogs, as above defined, of these polytetraalkylammonium and polytrialkylamine-containing hydrocarbon ligands are within the scope of the compounds and processes of the invention as defined in the following claims.

We claim:

1. A compound comprising a polytetraalkylammonium and/or polytrialkylamine covalently bonded to a solid inorganic support having the formula:

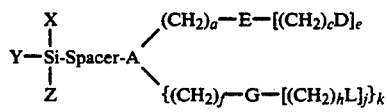

wherein Spacer is a 1 to 10 carbon member hydrophilic grouping; A is a member selected from the group consisting of $NR_x$, S and O where x is an integer such that all nitrogens are either quaternary or tertiary; E, D, G, and L are members selected from the group consisting of $NR_x$, S, and O, or SH and OH when S and O are located in a terminal position, with x being an integer such that the nitrogen atoms present are quaternary or tertiary; a, c, f and h are each integers ranging from 1 to 5; e and j are each integers ranging from 0 to 25; and k is an integer of 0 or 1; with the proviso that k must be 0 when A is S or O; R is a member selected from the group consisting of lower alkyl and halo, nitro or alkylamino substituted lower alkyl; with the further proviso that at least two of A, E, D, G or L must be a member selected from the group consisting of tetraalkylammonium, halo or nitro substituted tetraalkylammonium, trialkylamine, and halo or nitro substituted trialkylamine and X, Y, and Z are each a member selected from the group consisting of Cl, Br, I, alkyl, alkoxy, halo or nitro substituted alkyl, halo or nitro substituted alkoxy and O-solid support with the proviso that at least one of X, Y, and Z must be O-solid support.

2. A compound according to claim 1 wherein O-solid support is a member selected from the group consisting of silica, zirconia, titania, alumina, nickel oxide and any other functionally equivalent hydrophilic inorganic support materials.

3. A compound according to claim 1 wherein Spacer is a member selected from the group consisting of lower alkyl, aryl, glycidyl and alkylamino.

4. A compound according to claim 3 wherein X, Y, and Z are selected from the group consisting of methoxy and O-silica and Spacer is glycidyl.

5. A compound according to claim 4 having the formula:

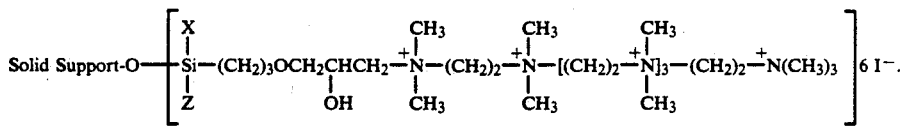

6. A compound according to claim 4 having the formula:

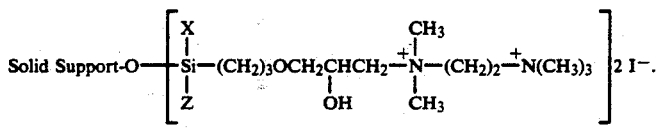

7. A compound according to claim 4 having the formula:

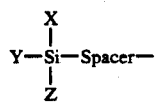

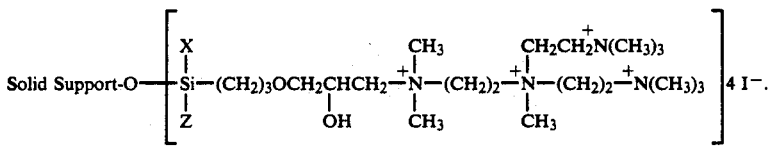

8. A compound according to claim 4 having the formula:

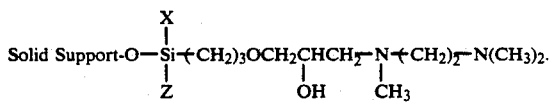

9. A compound according to claim 4 having the formula:

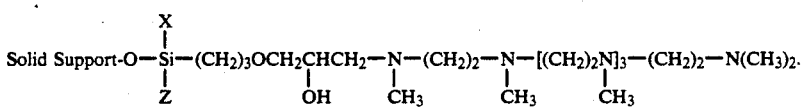

10. A compound according to claim 1 wherein the O-portion of the compound is a reaction product of O-solid hydrophilic support material with a silicon containing spacer grouping selected from the group consisting of dimethyl(triethoxysilylpropyl)malonate; 3-mercaptopropyltrimethoxysilane; 3-aminopropyltrimethoxysilane; N-[(3-trimethoxysilyl)propyl]ethylenediaminetriacetic acid; p-(chloromethyl)phenyltrimethoxysilane; vinyltriethoxysilane; 3-bromopropyltriethoxysilane; 3-glycidoxypropyltrimethoxysilane; and combinations thereof.

* * * * *